United States Patent
Chaudhry et al.

(10) Patent No.: US 11,703,254 B2
(45) Date of Patent: Jul. 18, 2023

(54) ELECTRONIC CONTROL SYSTEM FOR ELECTRIC WATER HEATER

(71) Applicant: Rheem Manufacturing Company, Atlanta, GA (US)

(72) Inventors: Raheel A. Chaudhry, Montgomery, AL (US); Stephen M. Maciulewicz, Wetumpka, AL (US); Jozef Boros, Montgomery, AL (US)

(73) Assignee: Rheem Manufacturing Company, Atlanta, GA (US)

( * ) Notice: Subject to any disclaimer, the term of this patent is extended or adjusted under 35 U.S.C. 154(b) by 231 days.

(21) Appl. No.: 16/397,779

(22) Filed: Apr. 29, 2019

(65) Prior Publication Data

US 2019/0249903 A1    Aug. 15, 2019

Related U.S. Application Data

(62) Division of application No. 14/080,422, filed on Nov. 14, 2013, now Pat. No. 10,274,226.

(60) Provisional application No. 61/770,381, filed on Feb. 28, 2013.

(51) Int. Cl.
| | |
|---|---|
| *F24H 9/20* | (2022.01) |
| *F24H 1/20* | (2022.01) |
| *G05D 23/19* | (2006.01) |
| *H05B 1/02* | (2006.01) |
| *H05B 3/42* | (2006.01) |

(52) U.S. Cl.
CPC ........... *F24H 9/2021* (2013.01); *F24H 1/202* (2013.01); *G05D 23/1934* (2013.01); *H05B 1/0283* (2013.01); *H05B 3/42* (2013.01)

(58) Field of Classification Search
CPC .... F24H 9/2021; F24H 1/202; G05D 23/1934

USPC .......................................................... 392/454
See application file for complete search history.

(56) References Cited

U.S. PATENT DOCUMENTS

| | | |
|---|---|---|
| 5,660,328 A | 8/1997 | Momber |
| 5,831,250 A | 11/1998 | Bradenbaugh |
| 6,242,720 B1 * | 6/2001 | Wilson ................ F24H 9/2021 219/486 |
| 6,265,699 B1 | 7/2001 | Scott |
| 6,308,009 B1 | 10/2001 | Shellenberger |
| 6,350,967 B1 | 2/2002 | Scott |
| RE37,745 E | 6/2002 | Brandt et al. |
| 6,560,409 B2 | 5/2003 | Troost, IV |
| 6,649,881 B2 * | 11/2003 | Scott .................... H05B 1/0283 392/435 |
| 6,766,835 B1 | 7/2004 | Fima |
| 6,795,644 B2 | 9/2004 | Bradenbaugh |
| 7,027,724 B2 | 4/2006 | Baxter |
| 7,099,572 B2 * | 8/2006 | Phillips ................ F24H 9/1818 392/459 |

(Continued)

*Primary Examiner* — Tu B Hoang
*Assistant Examiner* — Thomas J Ward
(74) *Attorney, Agent, or Firm* — Eversheds Sutherland (US) LLP

(57) ABSTRACT

In an electric water heater having adjustable set point and differential temperatures, upper and lower heating elements, and associated temperature sensors respectively operative to sense upper and lower tank water temperatures, a specially designed control system is provided for controlling the heating elements. The control system is operative to prevent dry firing of the heating elements by measuring temperatures over time with the temperature sensors.

20 Claims, 9 Drawing Sheets

(56) References Cited

U.S. PATENT DOCUMENTS

| | | |
|---|---|---|
| 7,373,080 B2 | 5/2008 | Baxter |
| 7,380,522 B2 | 6/2008 | Kreil et al. |
| 7,421,784 B2 | 9/2008 | Akkala et al. |
| 7,561,057 B2 | 7/2009 | Kates |
| 7,671,754 B2 * | 3/2010 | Heilmann ............ G01M 3/186 |
| | | 73/304 R |
| 7,712,677 B1 | 5/2010 | Munsterhuis et al. |
| 7,818,095 B2 * | 10/2010 | Hotton .................... F24H 1/205 |
| | | 219/490 |
| 8,031,079 B2 | 10/2011 | Kates |
| 8,126,320 B2 | 2/2012 | Cartwright |
| 2007/0034169 A1 | 2/2007 | Phillips |
| 2007/0175883 A1 | 8/2007 | Miu et al. |
| 2008/0314999 A1 | 12/2008 | Strand |
| 2010/0116812 A1 | 5/2010 | Watson et al. |

\* cited by examiner

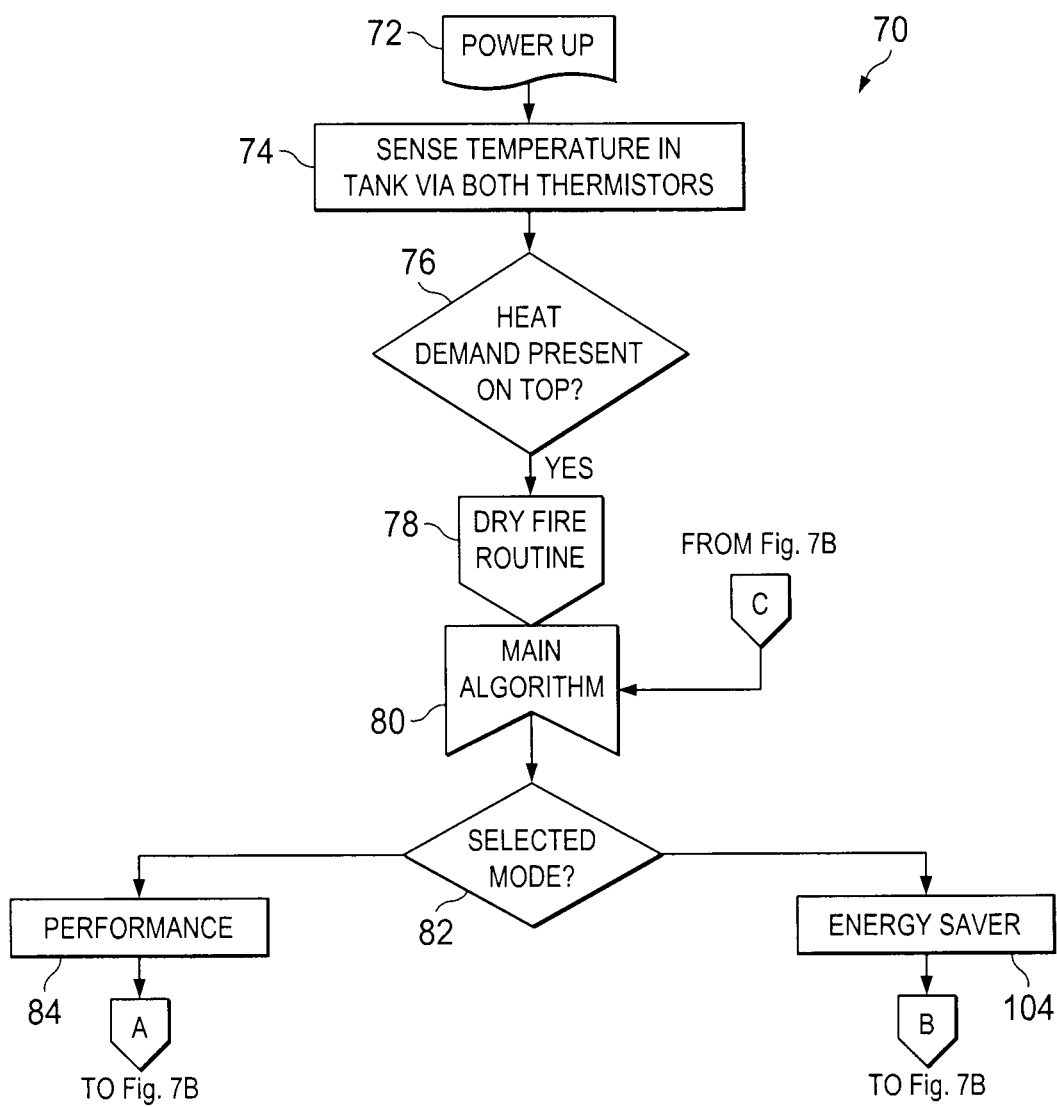

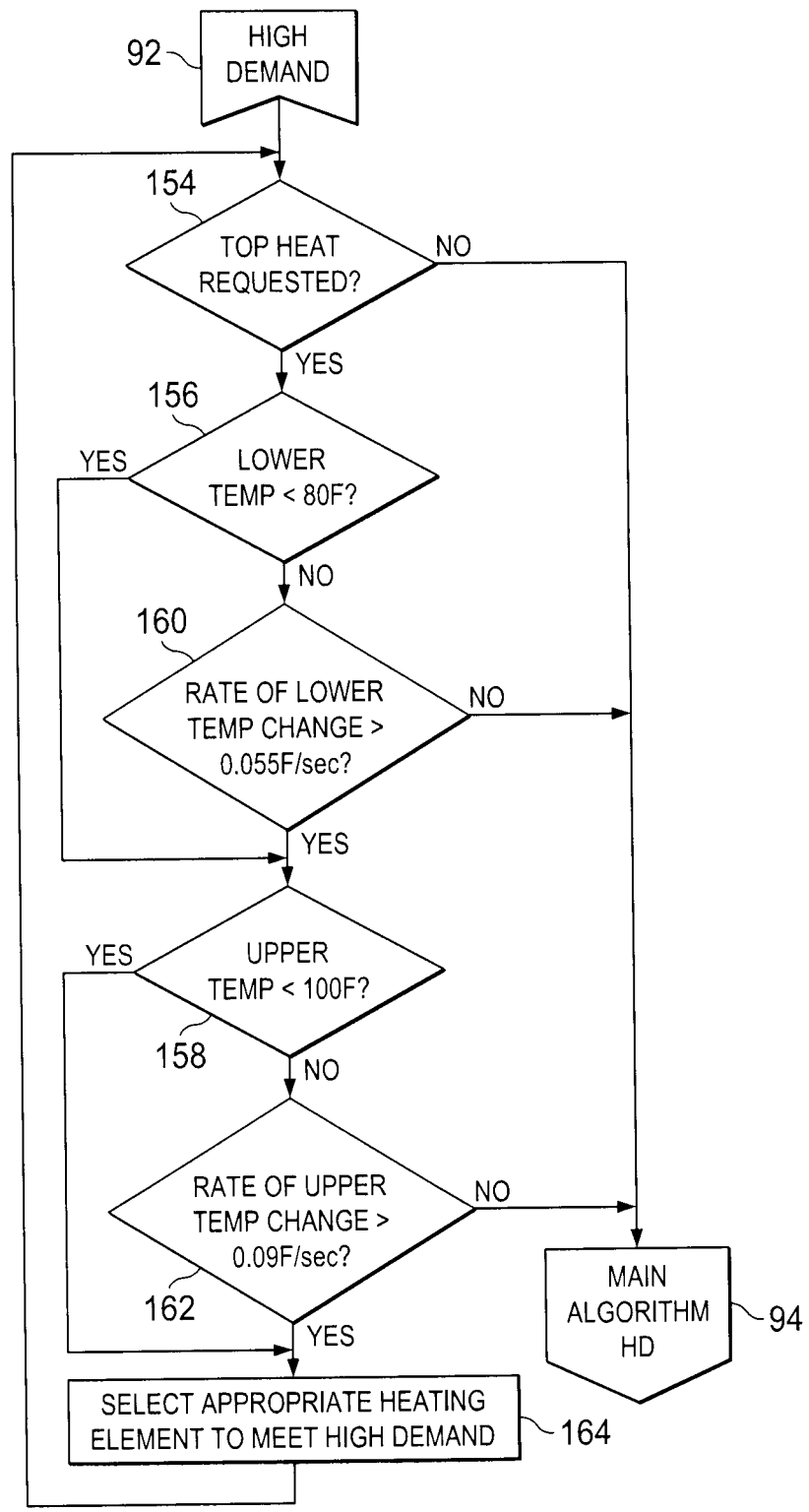

ELECTRONIC CONTROL SYSTEM FOR ELECTRIC WATER HEATER

CROSS-REFERENCE TO RELATED APPLICATION

The present application is a divisional application of and claims priority to U.S. patent application Ser. No. 14/080,422 filed Nov. 14, 2013, which claims the benefit of the filing date of provisional U.S. patent application No. 61/770,381 filed Feb. 28, 2013. The entire disclosures of the foregoing applications are hereby incorporated herein by this reference.

BACKGROUND OF THE INVENTION

The present invention relates generally to the control of electric liquid heating apparatus such as electric water heaters. A relatively recent development in the control of electric water heaters is to replace their fairly simple electrical/mechanical heating control systems with more sophisticated and flexible electronic control systems to increase the overall functionality and performance of the water heaters. The present invention is directed to the provision in an electric water heater of an electronic control system which provides the water heater with further enhanced flexibility and performance including, for example, algorithms for protecting the water heater against dry firing and providing it with different user-selectable operational modes to enhance performance and reduce operational energy costs.

In a representatively illustrated embodiment thereof, the present invention provides a dual element electric water heater having incorporated therein, among other features, a specially designed multifunction electronic control system implementing various control algorithms including a dry fire protection algorithm, a user-selectable performance mode algorithm, and a user-selectable energy saver mode algorithm.

SUMMARY

In one example, the present disclosure is directed to an electric liquid heating apparatus comprising a tank for storing liquid to be heated, an electric heating element extending into the interior of the tank, a temperature sensor operative to sense a temperature representative of a temperature of the liquid in the tank, and a control system operative to control the electric heating element and to prevent dry firing. Upon startup of the electric liquid heating apparatus, the control system samples a first temperature, waits a predetermined first time period, samples a second temperature, turns on the electric heating element, waits a predetermined second time period, and turns off the electric heating element. The control system shuts down the electric heating element if a third temperature detected by the temperature sensor is greater than the sum of the second temperature, a predetermined number of degrees, and the magnitude of a dry fire offset parameter. On the other hand, the control system permits normal operation of the electric liquid heating apparatus if, after expiration of a predetermined third time period, the temperature sensor does not detect a temperature greater than the sum of the second temperature, a predetermined number of degrees, and the magnitude of a dry fire offset parameter. The value of the dry fire offset parameter is proportional to the difference between the second and first temperatures, but not greater than 1.

These and other aspects and embodiments will be apparent from the following detailed description, claims and appended drawings.

BRIEF DESCRIPTION OF THE DRAWINGS

FIGS. 7A and 7B combined are a logic flow diagram of the overall control algorithm for the water heater;

FIG. 9 is a logic flow diagram of a high demand algorithm of the FIG. 7B logic flow diagram portion.

DETAILED DESCRIPTION

Figure 1:
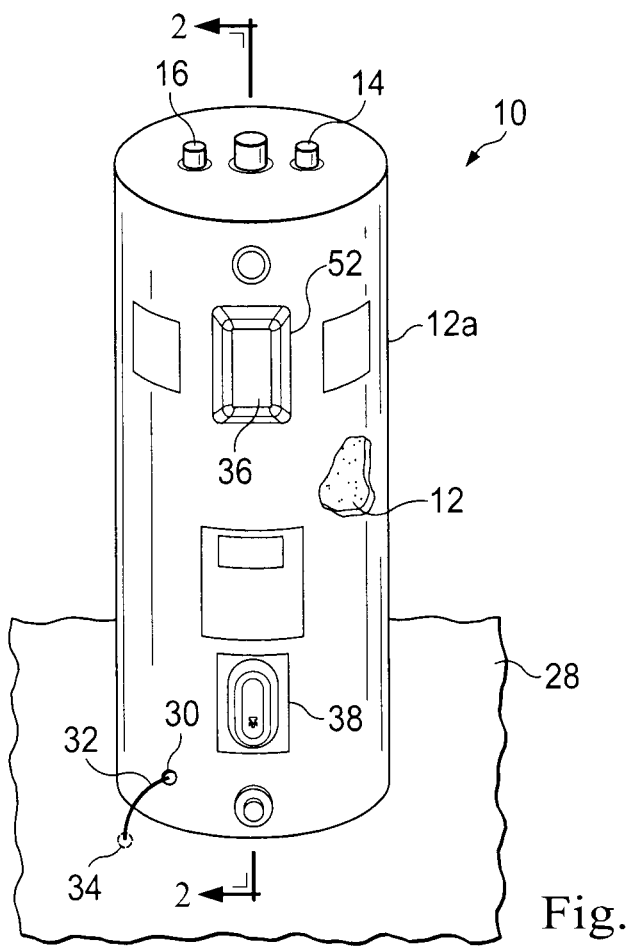
FIG. 1 is a perspective view of an electric water heater embodying principles of the present invention.
Figure 2:
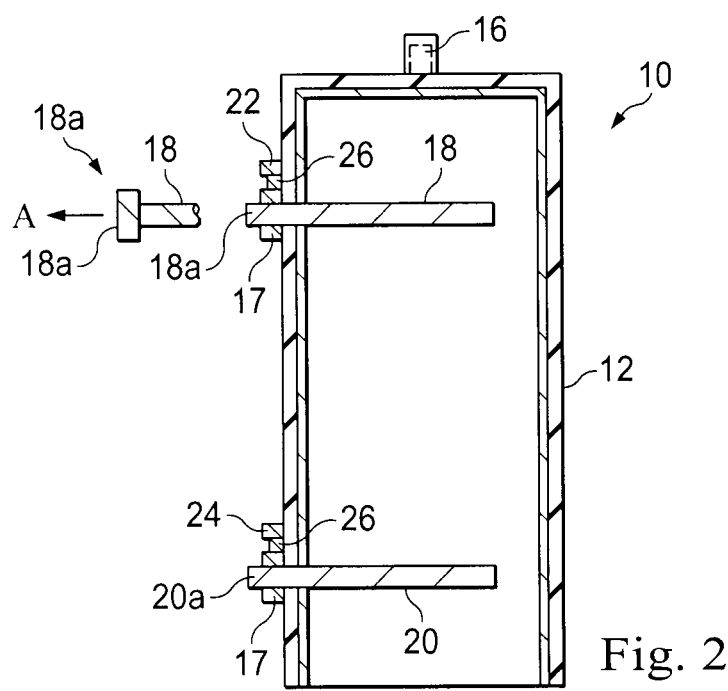
FIG. 2 is a simplified schematic cross-sectional view through the tank portion of the electric water heater taken generally along line 2-2 of FIG. 1.

Illustrated in FIGS. 1 and 2 is a representative embodiment 10 of an electric water heater embodying principles of the present invention. While principles of the present invention are representatively incorporated in an electric water heater, it will be readily appreciated by those of skill in this particular art that such principles may also be advantageously utilized in a variety of other types of electric liquid heating apparatus without departing from such inventive principles.

Water heater 10 representatively has a vertically oriented cylindrical metal storage tank 12 (covered with an insulated outer jacket structure 12a) with the usual cold water inlet and hot water outlet fittings 14,16 thereon. Respectively and threadingly extending through outwardly projecting annular side wall portions 17 of the tank 12 into the interior of the tank 12 are upper and lower electric heating elements 18,20 having, at their outer ends, enlarged body portions 18a,20a disposed on the outer sides of the annular tank portions 17. As indicated in phantom for the upper heating element 18 (see FIG. 1), each of the heating elements 18,20 may be outwardly removed through its associated annular tank portion 17 as shown by the dashed arrow "A" in FIG. 2.

Upper and lower thermistor type temperature sensing elements 22,24 are in thermal communication with the tank 12, but do not contact the heating elements 18 and 20, being supported on retainer members 26 secured to the annular, outwardly projecting tank side wall portions 17 and spacing the thermistors 22,24 upwardly apart therefrom. Since the thermistors 22,24 are mounted on the annular tank portions 17, as opposed to being mounted on and contacting the heating element bodies 18a,20a, the heating elements 18,20 may be removed from the tank without having to move the thermistors 22,24.

The thermistors 22,24 indirectly sense the water temperature within upper and lower portions of the tank 12, respectively, by externally sensing the temperature of such upper and lower tank portions. However, other types of temperature sensors could be alternatively utilized to directly sense the tank water temperatures within such upper and lower tank portions.

Accordingly, as used herein, phrases such as "sensing an upper tank temperature", "detected lower tank temperature" and the like are intended to encompass either indirect or direct sensing of water temperature within the indicated tank portions. Additionally, phrases such as "a temperature sensor operative to sense (or detect) the water temperature in an upper portion of the tank" encompass a temperature sensor operative to either directly or indirectly sense such tank water temperature.

As illustrated in FIG. 1, the lower end of the water heater 10 rests on a suitable horizontal support surface, such as a floor 28. Alternatively such support surface could be the bottom wall of a drain pan (not shown). Extending outwardly through a small jacket opening 30 adjacent the lower end of the water heater is a sensing lead structure 32. A suitable water detector 34 is connected to the outer end of the sensing lead structure 32 and is positioned on the floor 28 externally of the water heater 10. Water detector 34, as subsequently described herein, is integrated with an electronic controller portion of the water heater 10 and is operative to detect water leaking from the tank 12 or originating from other sources, thereby causing the electronic controller to sound an alarm and/or shut down the water heater 10.

Still referring to FIG. 1, on the water heater 10 an upper cavity cover 36 extends outwardly over the outer end of the upper heating element 18, the upper thermistor 22, a subsequently described electronic control board and associated user interface, and an ECO with associated harness/wiring. A lower cavity cover 38 extends outwardly over the outer end of the lower heating element 20 along with associated harness/wiring, and the lower thermistor 24.

Figure 3:
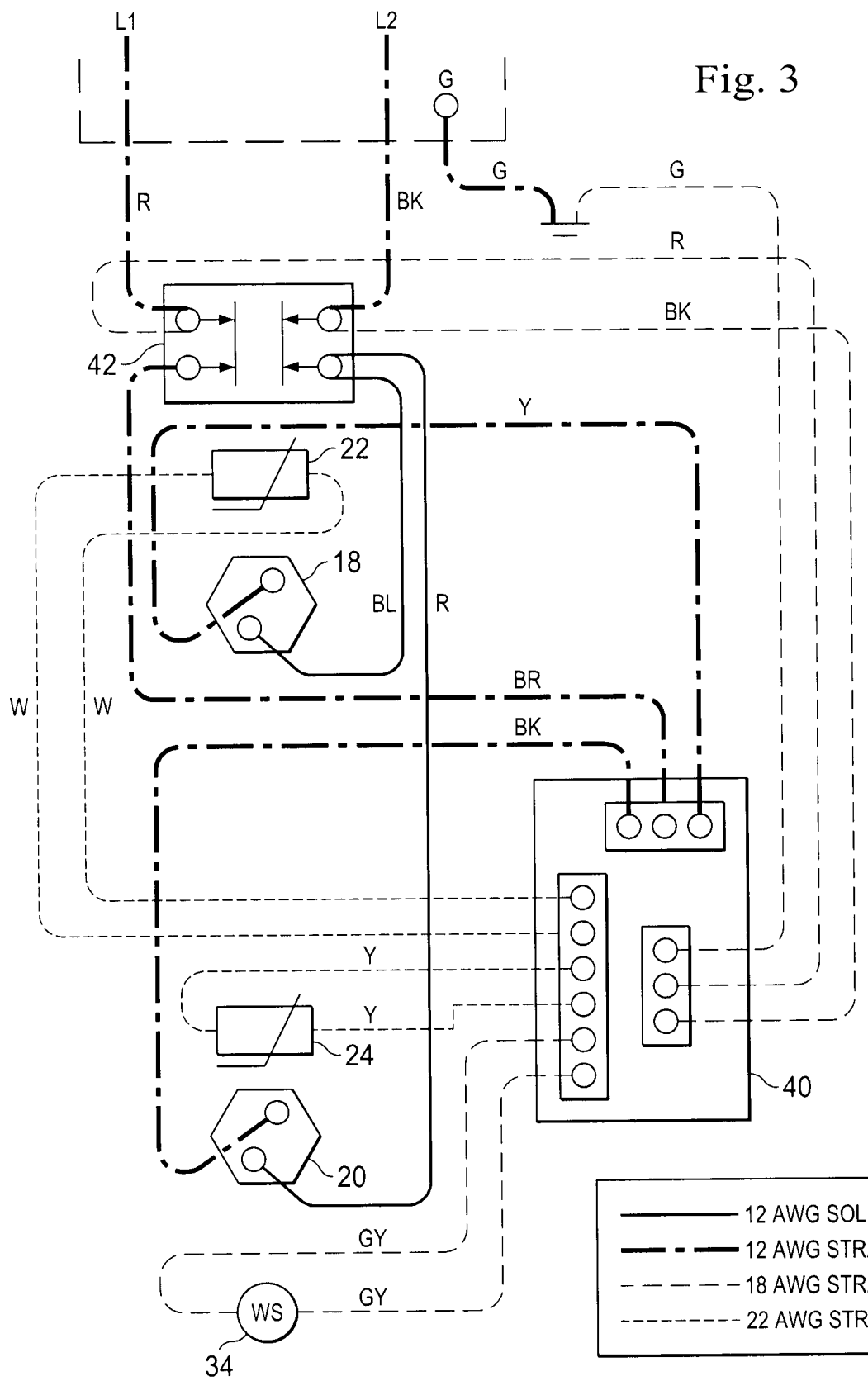
FIG. 3 is a schematic electrical wiring diagram for the water heater.

FIG. 3 show a schematic wiring diagram for the dual heating element electric water heater 10, the components wired as shown providing the water heater 10 with non-simultaneous energization control of its upper and lower electric heating elements 18 and 20. The depicted electrical circuit comprises the upper and lower heating elements 18 and 20, the upper and lower thermistors 22 and 24, the water sensor or detector 34, and a specially designed electronic control 40 disposed behind the upper cavity cover 36 and as subsequently described herein. These components are electrically coupled as schematically shown in FIG. 3 and receive electrical power via power leads L1 and L2 via ECO 42 (disposed behind the upper cavity cover 36).

Figure 4:
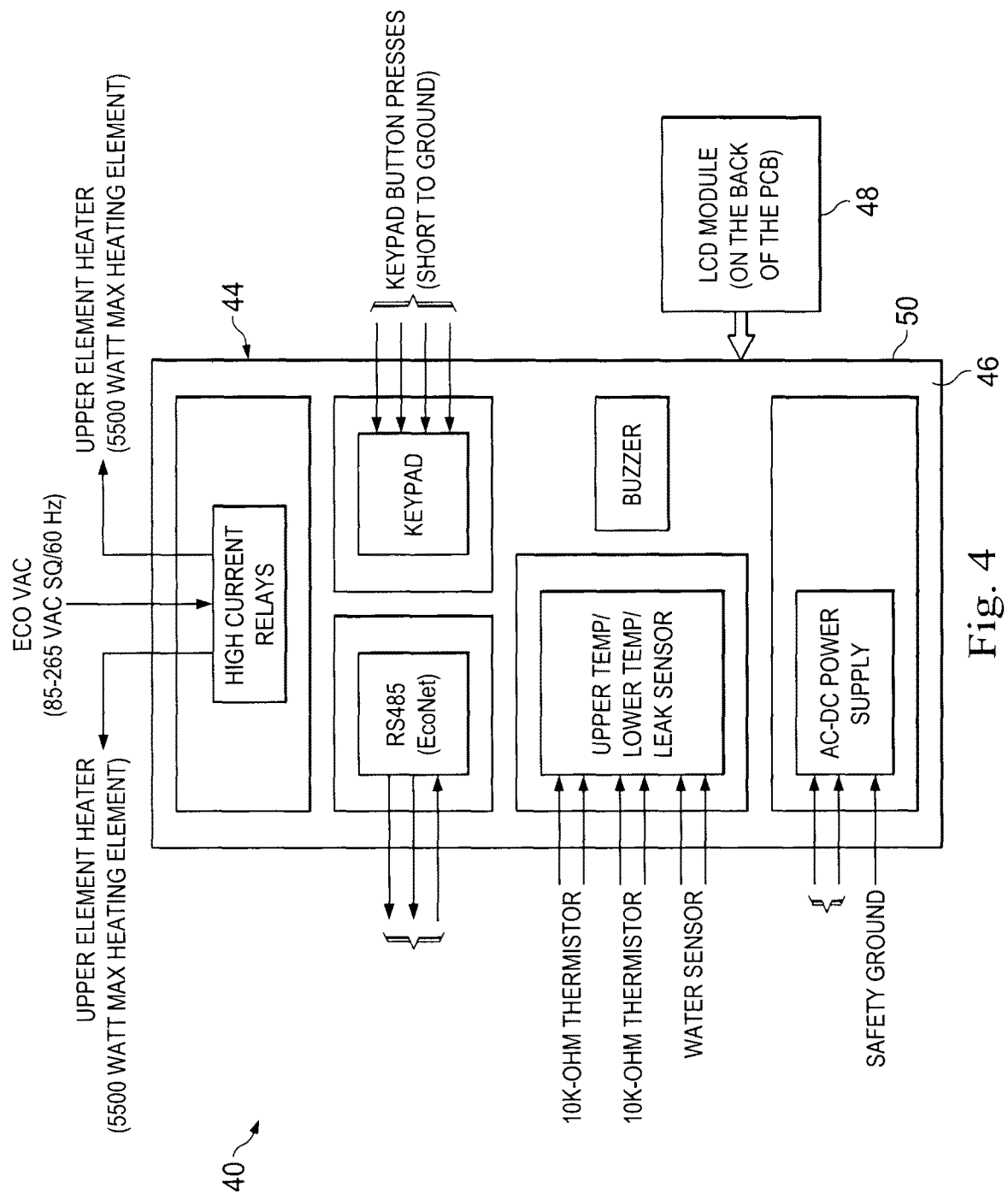
FIG. 4 is a simplified block diagram of an electronic control/display portion of the water heater.

The electronic control 40 is shown in simplified block form in FIG. 4 and comprises a circuit board 44 having the indicated connector structures on one side 46 thereof, and an LCD module 48 on the other side 50 thereof. As subsequently described herein, the LCD module 48 is used to display various control settings chosen by a user—either at the water heater 10 or remotely through a data input port 52 on the upper cavity cover 36 of the water heater 10 (see FIG. 1).

Figure 5:
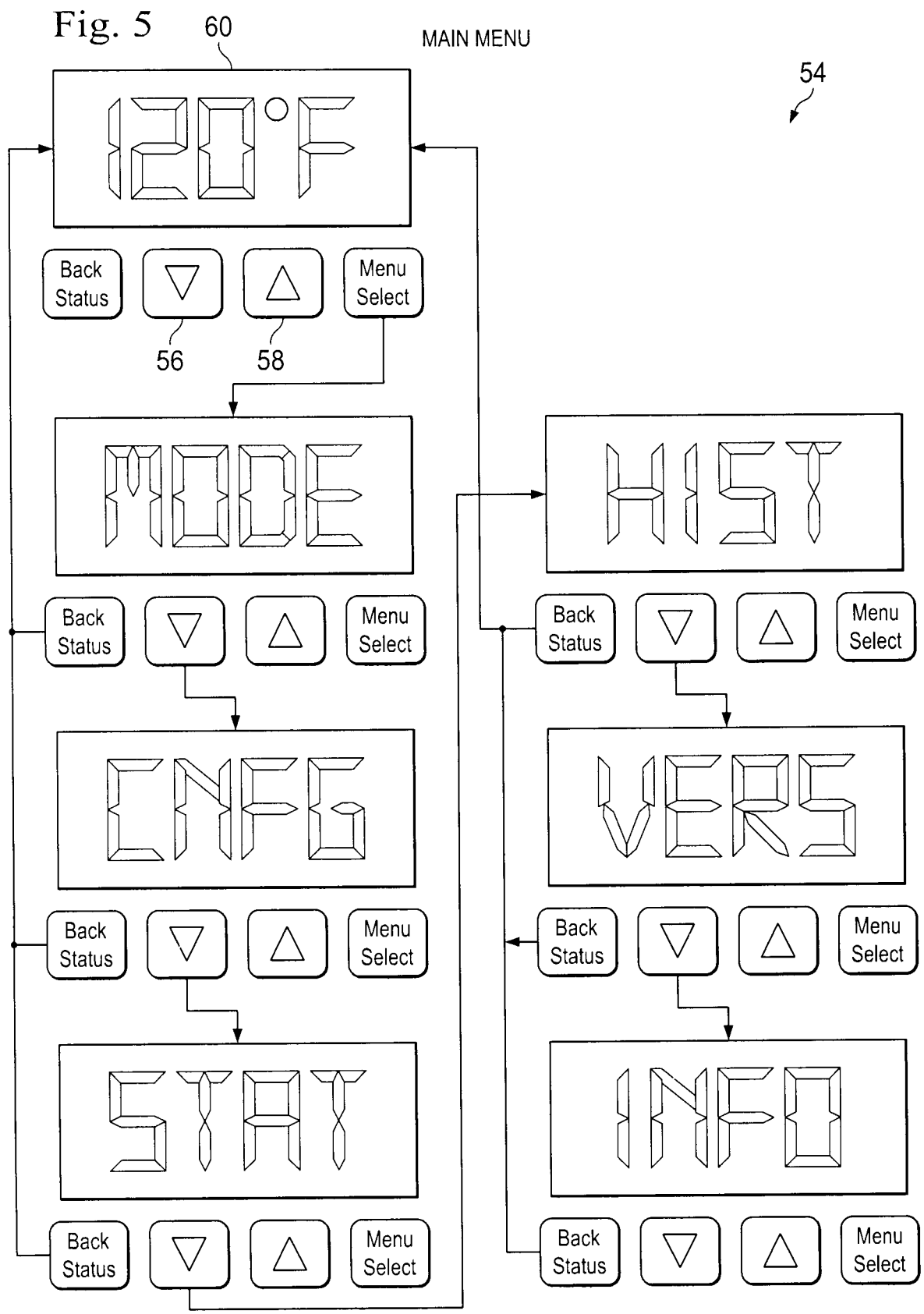
FIG. 5 is an illustration of the main menu portion of an LCD user display/operational selection portion of the water heater.
Figure 6:
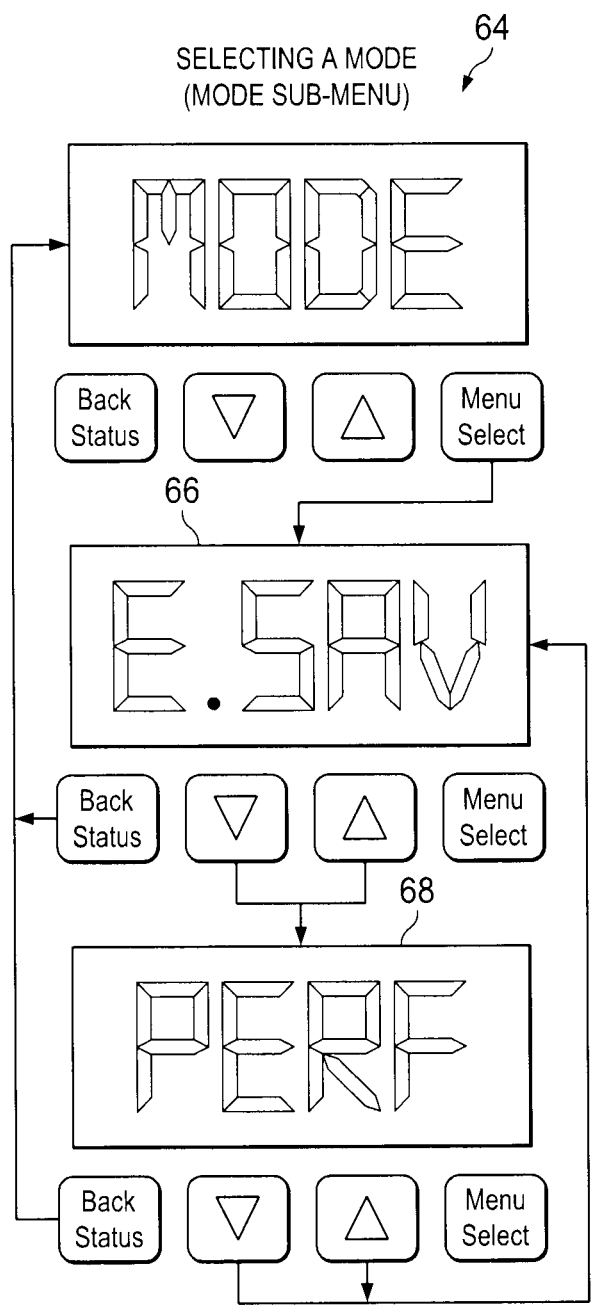
FIG. 6 is an illustration of a mode sub-menu portion of the LCD user display/operational selection portion of the water heater.

FIG. 5 shows a main menu display portion 54 of the electronic control system of the present invention which is positioned at the upper cavity cover 36 (see FIG. 1). Using keypad keys 56,58 a user may respectively adjust the set point temperature of the water heater 10 as shown in the LCD display area 60. Similar adjustments may be made remotely via the data input port 52 (see FIG. 1). Using the key pad associated with the LCD display, the user may also select the desired operational mode of the water heater by bringing up the mode sub-menu display 64 shown in FIG. 6.

This gives the user the choice of an "energy saver" mode 66 or a "performance" mode 68. The operational details of these two user-selectable modes will be subsequently discussed herein in conjunction with FIG. 7.

Figure 7B:
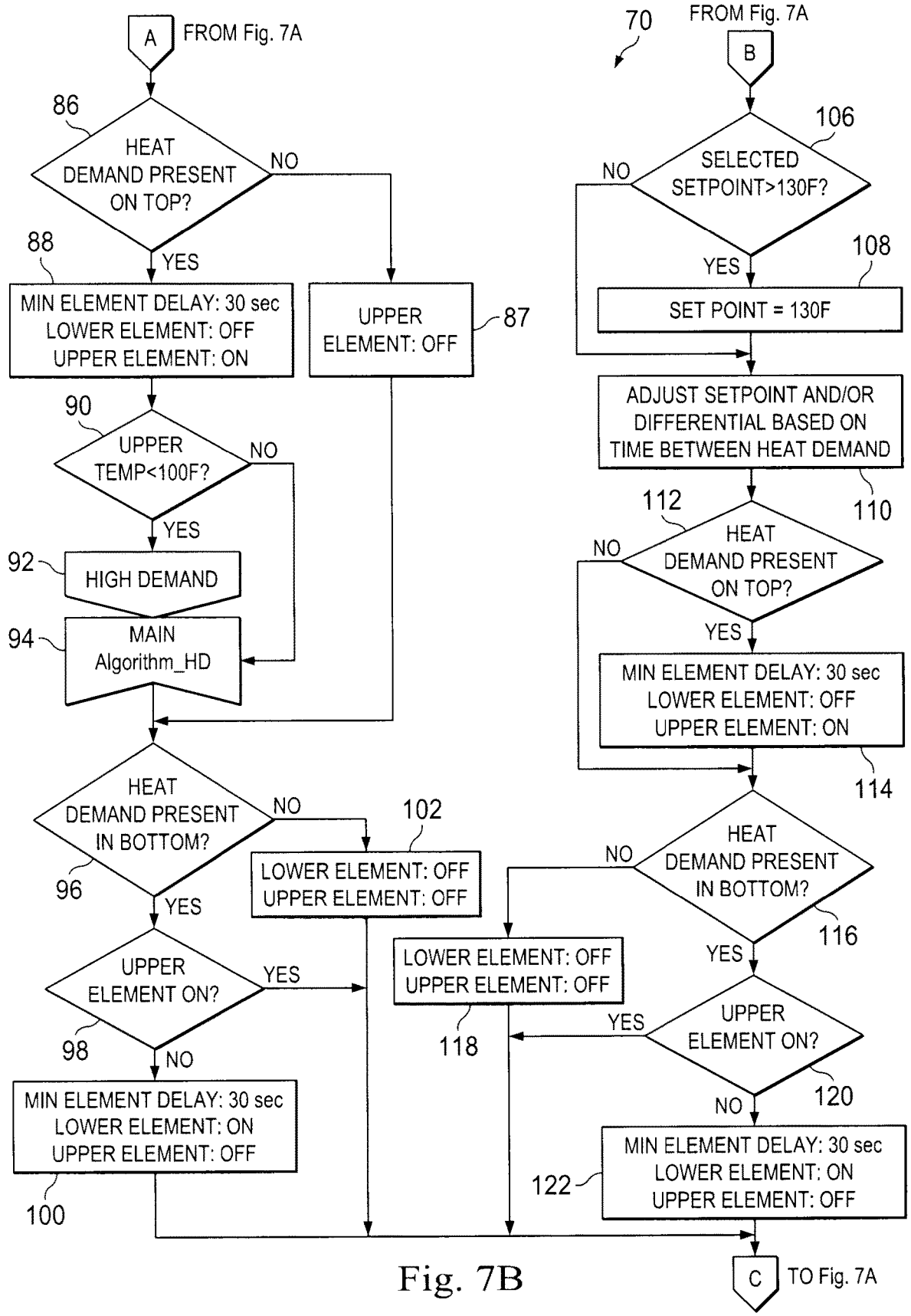

The logic flow diagram 70 of FIGS. 7A and 7B details the overall operation of the water heater 10 provided by the specially designed electronic control system of the present invention via the electronic control 40 (schematically depicted in FIGS. 3 and 4). Turning now to FIG. 7, in response to the initial power up of the water heater 10 at step 72 the system, at step 74, reads the tank temperatures detected by the upper and lower thermistors 22 and 24 and determines, at step 76 (with neither of the heating elements 18,20 yet energized), whether there is a heat demand in the top portion of the tank 12. If there is, a transfer is made to step 78 at which a subsequently described dry fire routine or algorithm is carried out to test for a dry fire condition. If the dry fire test is passed, a transfer is made to a main control algorithm 80. If the dry fire test is failed, as subsequently described an error is set and the heating elements are shut down.

The main algorithm 80, when initiated, first determines, at step 82, which operational mode has been selected by the user. If the performance mode has been selected, the performance mode is initiated at step 84 by a transfer to step 86 at which a query is made as to whether a heat demand is present in the top portion of the tank (as detected by the upper thermistor 22). If there is a top heat demand, a transfer is made to step 88 at which the lower heating element 20 (if on) is turned off and, after a predetermined delay (representatively 30 seconds) the upper heating element 18 is turned on. If the lower heating element 20 is already off, the upper heating element 18 is turned on without such a time delay.

Next, at step 90 a query is made as to whether the upper tank temperature (as sensed by the upper thermistor 22) is less than 100 degrees F. If the answer to the query is "yes" a transfer is made to a subsequently described high demand routine 92. If the requirements of the high demand routine 92 are met, a transfer is made to step 94 at which a main high demand algorithm is initiated. If the answer to the query at step 90 is "no", a transfer from step 90 to step 94 is made, bypassing the high demand routine at step 92.

The initiation of the main high demand algorithm at step 94 causes a transfer to step 96. If the answer to the step 86 query is "no", a transfer is also made to step 96, via step 87 at which the upper heating element 18 is turned off. At step 96 a query is made as to whether there is a heat demand present in the bottom tank portion (as detected by the lower thermistor 24). If there is, a query is made at step 98 as to whether the upper heating element 18 is on. If it is, a transfer is made from step 98 back to the main algorithm step 80. If it is not, a transfer is made from step 98 to step 100 at which the lower heating element 20 is turned on and a transfer made from step 100 back to the main algorithm step 80. If the answer to the step 96 query is "no", a transfer is made from step 96 to step 102 at which both heating elements 18,20 are turned off and a transfer is made from step 102 back to the main algorithm step 80.

If at step 82 it is determined that the user has selected the energy saver mode of operation of the water heater 10, the energy saver mode is initiated at step 104 by a transfer to step 106 at which a query is made as to whether the user-selected setpoint temperature is greater than 130 degrees F. If it is, a transfer is made to step 108 at which the setpoint is reduced to 130 degrees F. (or some other predetermined magnitude). A transfer is then made to step 110 from step 108. If the answer to the step 106 query is "no", a transfer is also made (from step 106) to step 110.

At step 110 the control system adjusts the water heater setpoint temperature and differential (the difference between the water heater setpoint temperature and the lower water temperature at which a call for heat is initiated) based on the sensed time between the current heat demand and the immediately prior heat demand. For example, if the time between these two successive heat demands is sufficiently long, the setpoint temperature may be lowered by a predetermined amount and/or the temperature differential increased by a predetermined amount.

From step 110 a transfer is made to step 112 at which a query is made as to whether there is a heat demand present in the top tank portion. If there is, a transfer is made to step 114 at which the upper heating element 18 is turned on—either immediately if the lower heating element 20 is off: or after a minimum predetermined time delay (illustratively 30 seconds) after turning the lower element off. A transfer is then made from step 114 to step 116. Alternatively, if the answer to the step 112 query is "no", a transfer is made from step 112 to step 116. At step 116 a query is made as to whether there is a heat demand present in the bottom tank portion. If there is not, a transfer is made from step 116 to step 118 at which both of the upper and lower heating elements 18,20 are set to off and a transfer is made from step 118 back to the main algorithm step 80.

If the answer to the step 116 query is "yes", a transfer is made from step 116 to step 120 at which a query is made as to whether the upper heating element 18 is on. If it is, a transfer is made from step 120 back to the main algorithm step 80. If it is not, a transfer is made from step 120 to step 122 at which the lower heating element 20 is turned on and a transfer is made from step 122 back to the main algorithm step 80.

Figure 8:
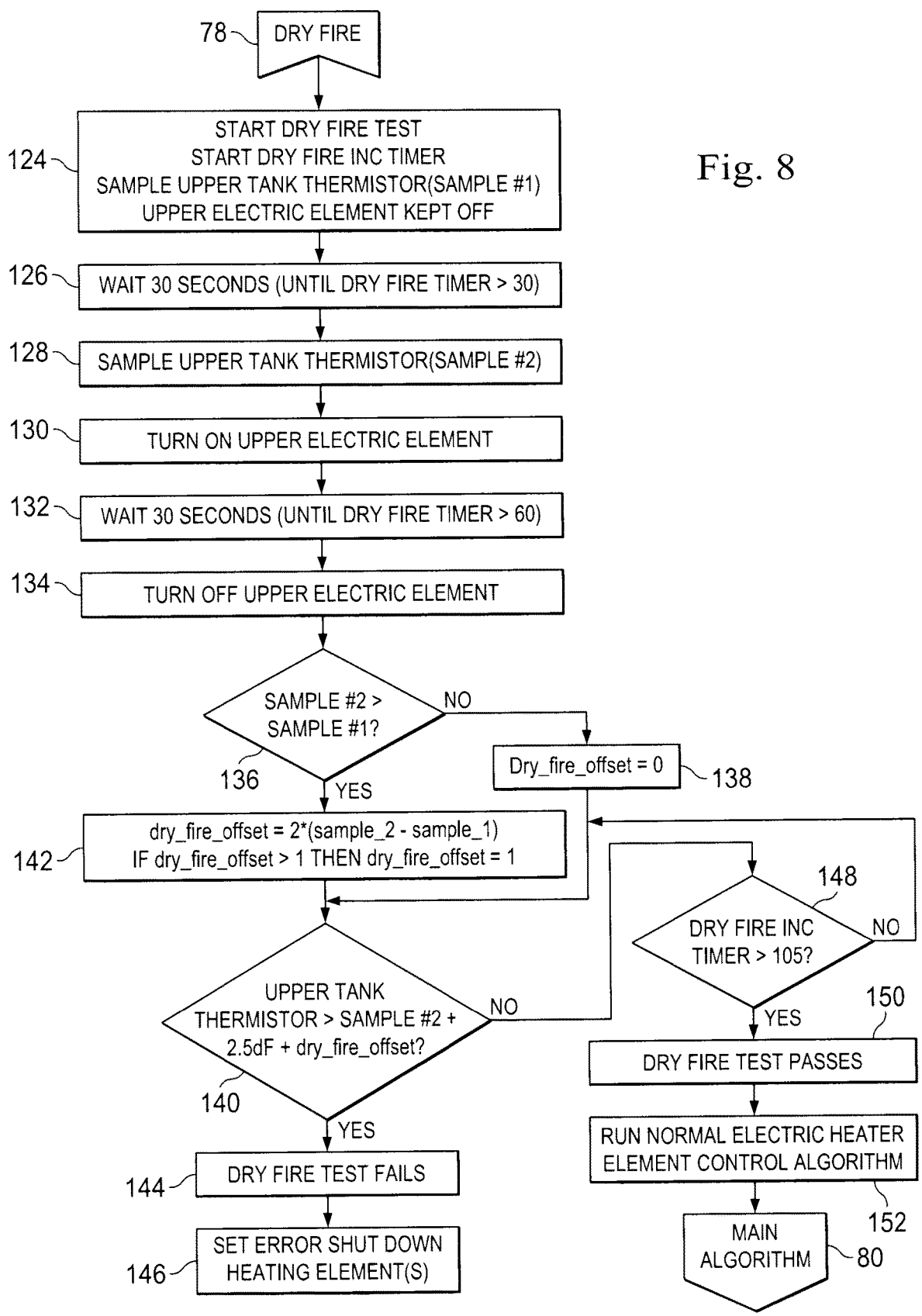
FIG. 8 is a logic flow diagram of a dry fire protection algorithm of the FIG. 7A logic flow diagram portion.

The various steps in the previously mentioned dry fire routine 78 shown in FIG. 7A are detailed in the logic flow chart of FIG. 8. Initiation of the dry fire routine 78 causes the sequential performance of steps 124-134.

At step 124 a dry fire test is initiated by starting a dry fire incremental timer, storing a parameter "sample #1" having a value equal to the upper thermistor-sensed temperature, and keeping the upper heating element 18 off.

At step 126 the system waits a predetermined time (representatively 30 seconds) after the start of the timer.

At step 128 the system stores a parameter "sample #2" having a value equal to the upper thermistor-sensed temperature.

At step 130 the upper heating element 18 is turned on.

At step 132 the system waits a predetermined time (representatively 30 seconds) until the dry fire timer elapsed time is greater than 60 seconds.

At step 134 the upper heating element 18 is turned off and a transfer is made to step 136 at which a query is made as to whether the magnitude of the parameter "sample #2" is greater than the magnitude of the parameter "sample #1". If it is not, at step 138 the value of a parameter "dry_fire_offset" is set to zero and a transfer is made to step 140. If the answer to the step 136 query is "yes", at step 142 dry_fire_offset is set to the value 2 (sample_2−sample_1) unless such value is greater than 1 in which case dry_fire_offset is set to the value of 1. A transfer is then made from step 142 to step 140.

At step 140 a query is made as to whether the temperature detected by the upper thermistor 22 is greater than the magnitude (sample_2+2.5 degrees F.+dry_fire_offset). If it is, the dry fire test is failed and a transfer is made from step 140 to step 144 which triggers the setting, at step 146, of an error and a shut down of the heating elements 18 and 20. If the answer to the step 140 query is "no", a transfer is made from step 140 to step 148 at which a query is made as to whether the time on the dry fire timer has reached a predetermined value (representatively 105 seconds). If it has not, the system loops back through steps 140 and 148 until the timer reaches 105 seconds at which time the dry fire test is passed and a transfer is made from step 148 to step 150, thereby triggering, at step 152, a return to the main algorithm 80 in the previously described FIG. 7A flow chart portion.

The calculation and use of the "dry_fire_offset" parameter incorporated in the dry fire protection algorithm 78 is a primary feature of the algorithm and serves to eliminate spurious dry fire condition indications when, just before the upper heating element 18 is energized in step 130 of the dry fire algorithm 78 the tank water temperature is rising due to, for example, water flowing into the tank 12 having a temperature higher than the tank water in an upper portion of the tank, or the tank water temperature rising due to the effects of a higher external ambient temperature. As can be seen in step 140 of the algorithm 78, the inclusion of the "dry_fire_offset" parameter in the dry fire temperature calculation provides a measure of compensation for this water temperature rise occurring prior to the test firing of the upper heating element 18. Preferably, as described above, the dry fire protection algorithm is called into play only in the event that the water heater 10 is being initially powered up. Alternatively, however, the dry fire protection algorithm 78 can be utilized at the start of every heating demand cycle if desired.

The steps in the high demand routine 92 shown in the FIG. 7B flow chart portion are depicted in the logic flow chart of FIG. 9. When the high demand subroutine is reached at step 92, a transfer is made to step 154 at which a query is made as to whether a heat demand exists in the top tank portions. If it does not, a transfer is made back to the main high demand algorithm 94 shown in the FIG. 7B logic flow chart portion. If such upper tank heating demand does exist, a transfer is made from step 154 to step 156 at which a query is made as to whether the lower tank temperature (sensed by the lower thermistor 24) is less than 80 degrees F. If it is, a transfer is made from step 156 to step 158. If it is not, a transfer is made from step 156 to step 160 at which a query is made as to whether the rate of lower tank temperature change is greater than a predetermined change rate (representatively 0.055 degrees F./second). If it is not, a transfer is made from step 160 back to the main high demand algorithm 94 shown in FIG. 7. If it is, a transfer is made from step 160 to step 158.

At step 158 a query is made as to whether the sensed upper tank temperature is less than a predetermined magnitude (representatively 100 degrees F.). If it is not, a transfer is made from step 158 to step 162 at which a query is made as to whether the rate of change of the sensed upper tank temperature is greater than a predetermined magnitude (representatively 0.09 degrees F.). If it is not, a transfer is made from step 162 back to the main high demand algorithm 94 shown in FIG. 7. If it is, a transfer is made from step 162 to step 164. Similarly, if the step 158 query answer is "yes" a transfer is made from step 158 to step 164. At step 64 the appropriate heating element (representatively the upper heating element 18) to meet the high demand condition and a transfer is made to the previous step 154.

Briefly summarizing the user-selectable "performance" and "energy saver" modes, with the exception of the specially designed high demand algorithm 92 therein, the performance mode is generally similar to a conventional non-simultaneous actuation control method for dual heating elements in an electric water heater in which operational priority is given to the upper heating element over the lower heating element. In such method, the upper and lower heating elements cooperate during a heat demand to raise the upper tank temperature in satisfying the heat demand.

When the high demand algorithm 92 is called into play in the selected performance mode of the present invention, however, only the upper heating element 18 is utilized to fully heat up the water in the upper tank portion, and the final temperature in such upper tank portion is higher than when the high demand algorithm 92 is called into play.

The following is an example of the contrast between the performance mode operation with and without the high demand algorithm 92 being utilized therein. For purposes of comparison between the utilization and non-utilization of the high demand algorithm 92 in the performance mode, it will be assumed that the water heater set point temperature is 135 degrees F., the top heating element temperature differential is 9 degrees F., the bottom heating element temperature differential is 13 degrees F., and the tank temperature is 115 degrees F. for the entire tank.

Where the high demand algorithm 92 is not utilized in the performance mode, the upper heating element will come on and satisfy the tank until 131 degrees F. (representatively 4 degrees F. lower than the set point temperature) to reduce the overshoot induced by the lower element.

Then the lower heating element will come on and induce an overshoot at the top portion of the tank that will take the upper tank temperature to 135 degrees F. before reaching 135 degrees F. in the bottom tank portion as well.

In contrast, when the high demand algorithm 92 is utilized in the performance mode, the upper heating element will come on until the upper temperature reaches 135 degrees F. The bottom heating element will come on after that.

When selected by a user, the energy saver mode provides a desirable energy cost saving by adjusting the water heater's set point and/or temperature differential as a function of detected times between successive water heating demands.

The foregoing detailed description is to be clearly understood as being given by way of illustration and example only, the spirit and scope of the present invention being limited solely by the appended claims.

What is claimed is:

1. An electric liquid heating apparatus comprising:
   a tank for storing liquid to be heated;
   an electric heating element extending into an interior of said tank;
   a temperature sensor operative to sense a temperature representative of a temperature of the liquid in said tank; and
   an electronic control system operative to control said electric heating element and prevent dry firing thereof, said electronic control system functioning, upon startup of said electric liquid heating apparatus, to sequentially:
   (1) sample a first temperature detected by said temperature sensor,
   (2) wait for a predetermined first time period,
   (3) sample a second temperature detected by said temperature sensor,
   (4) turn on said electric heating element,
   (5) determine a difference between said second and first temperatures,
   (6) set a dry fire offset, for use in dry fire detection, based on the difference between said second and first temperatures, sampled prior to turning on said electric heating element, multiplied by two, wherein the dry fire offset is set to one when the product of two multiplied by the difference is greater than one,
   (7) set a dry fire threshold, for use in the dry fire detection, based on a sum of a third temperature and the dry fire offset,
   (8) wait for a predetermined second time period,
   (9) turn off said electric heating element, and then
   (10)(a) shut down said electric heating element if a fourth temperature detected by said temperature sensor is greater than the dry fire threshold, or
   (10)(b) permit normal operation of said electric liquid heating apparatus if, after an expiration of a predetermined third time period, said temperature sensor does not detect a temperature greater than said dry fire threshold.

2. The electric liquid heating apparatus of claim 1 wherein:
   the temperature sensor is a thermistor externally mounted on the tank.

3. The electric liquid heating apparatus of claim 1 wherein:
   said electric heating element is an upper electric heating element extending through an upper portion of said tank, said temperature sensor is an upper temperature sensor operative to sense a temperature indicative of the temperature of liquid in the upper portion of said tank, and
   said electric liquid heating apparatus further comprises a lower electric heating element extending through a bottom portion of said tank, and a lower temperature sensor operative to sense a temperature representative of the temperature of liquid in a lower portion of said tank.

4. The electric liquid heating apparatus of claim 3 wherein:
   said upper and lower temperature sensors are thermistors externally mounted on said tank.

5. The electric liquid heating apparatus of claim 4 wherein:
   said tank has annular side wall projections outwardly through which said upper and lower electric heating elements are removable, and
   said upper and lower thermistors are secured to said annular side wall projections in a manner permitting removal of said upper and lower electric heating elements therethrough without removing said upper and lower thermistors therefrom.

6. The electric liquid heating apparatus of claim 1 wherein:
   said electric liquid heating apparatus is an electric water heater.

7. The electric liquid heating apparatus of claim 1 wherein:
   the electronic control system comprises an electronic controller portion and an associated user input display.

8. The electric liquid heating apparatus of claim 7 wherein:
   the electronic control system further comprises a data input port for receiving user input.

9. The electric liquid heating apparatus of claim 7 wherein:
   the electronic control system further comprises a water detector operative to detect a presence of water externally adjacent said tank.

10. The electric liquid heating apparatus of claim 9 wherein:
the water detector comprises a probe and a sensing lead extending from the probe to the electronic controller portion of the electronic control system.

11. A method to prevent dry firing in an electric liquid heating apparatus comprising a tank for storing liquid to be heated, an electric heating element extending into an interior of the tank, and a temperature sensor operative to sense a temperature representative of a temperature of the liquid in the tank, the method comprising:
sampling, by an electronic control system, a first temperature detected by the temperature sensor;
waiting, by the electronic control system, for a predetermined first time period;
sampling, by the electronic control system, a second temperature detected by the temperature sensor;
turning on, by the electronic control system, the electric heating element;
determining a difference between the second and first temperatures;
setting, by the electronic control system, a dry fire offset, for use in dry fire detection, based on the difference between said second and first temperatures, sampled prior to turning on said electric heating element, multiplied by two, wherein the dry fire offset is set to one when the product of two multiplied by the difference is greater than one;
setting, by the electronic control system, a dry fire threshold, for use in the dry fire detection, based on a sum of a third temperature and the dry fire offset;
waiting, by the electronic control system, for a predetermined second time period;
turning off, by the electronic control system, the electric heating element; and then
shutting down, by the electronic control system, the electric heating element if a fourth temperature detected by the temperature sensor is greater than the dry fire threshold; or
permitting, by the electronic control system, normal operation of the electric liquid heating apparatus if, after an expiration of a predetermined third time period, the temperature sensor does not detect a temperature greater than the dry fire threshold.

12. An electric liquid heating apparatus having a tank for storing liquid to be heated, an electric heating element extending into an interior of the tank, and a temperature sensor operative to sense a temperature representative of a temperature of the liquid in the tank, the electric liquid heating apparatus comprising:
an electronic control system configured to, upon startup of the electric liquid heating apparatus, sequentially:
sample a first temperature detected by the temperature sensor,
wait for a predetermined first time period,
sample a second temperature detected by the temperature sensor,
turn on the electric heating element,
determine a difference between the second and first temperatures,
set a dry fire offset, for use in dry fire detection, based on the difference between said second and first temperatures, sampled prior to turning on said electric heating element, multiplied by two, wherein the dry fire offset is set to one when the product of two multiplied by the difference is greater than one;
set a dry fire threshold, for use in the dry fire detection, based on a sum of a third temperature and the dry fire offset,
wait for a predetermined second time period,
turn off the electric heating element, and then
shut down the electric heating element if a fourth temperature detected by the temperature sensor is greater than the dry fire threshold, or
permit normal operation of the electric liquid heating apparatus if, after an expiration of a predetermined third time period, the temperature sensor does not detect a temperature greater than the dry fire threshold.

13. The electric liquid heating apparatus of claim 12 wherein the temperature sensor is a thermistor externally mounted on the tank.

14. The electric liquid heating apparatus of claim 12 wherein:
the electric heating element is an upper electric heating element extending through an upper portion of the tank, the temperature sensor is an upper temperature sensor operative to sense a temperature indicative of the temperature of liquid in the upper portion of the tank, and
the electric liquid heating apparatus further comprises a lower electric heating element extending through a bottom portion of the tank, and a lower temperature sensor operative to sense a temperature representative of the temperature of liquid in a lower portion of the tank.

15. The electric liquid heating apparatus of claim 14 wherein:
the upper and lower temperature sensors are thermistors externally mounted on the tank.

16. The electric liquid heating apparatus of claim 15 wherein:
the tank has annular side wall projections outwardly through which the upper and lower electric heating elements are removable, and
the upper and lower thermistors are secured to the annular side wall projections in a manner permitting removal of the upper and lower electric heating elements therethrough without removing the upper and lower thermistors therefrom.

17. The electric liquid heating apparatus of claim 12 wherein:
the electric liquid heating apparatus is an electric water heater.

18. The electric liquid heating apparatus of claim 12 wherein:
the controller comprises an associated user input display.

19. The electric liquid heating apparatus of claim 12 wherein:
the controller comprises a data input port for receiving user input.

20. The electric liquid heating apparatus of claim 12 wherein:
the controller further comprises a water detector operative to detect a presence of water externally adjacent the tank.

* * * * *